United States Patent
Lao et al.

(10) Patent No.: US 12,511,481 B2
(45) Date of Patent: Dec. 30, 2025

(54) INFORMATION LEARNING APPARATUS, METHOD, AND STORAGE MEDIUM

(71) Applicant: KABUSHIKI KAISHA TOSHIBA, Tokyo (JP)

(72) Inventors: Yingying Lao, Kanagawa (JP); Masahiro Ito, Tokyo (JP); Tomohiro Yamasaki, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 315 days.

(21) Appl. No.: 18/458,485

(22) Filed: Aug. 30, 2023

(65) Prior Publication Data
US 2024/0242030 A1 Jul. 18, 2024

(30) Foreign Application Priority Data

Jan. 12, 2023 (JP) .................. 2023-003202

(51) Int. Cl.
*G06F 40/284* (2020.01)
*G06F 40/268* (2020.01)

(52) U.S. Cl.
CPC .......... *G06F 40/284* (2020.01); *G06F 40/268* (2020.01)

(58) Field of Classification Search
CPC .............................. G06F 40/268; G06F 40/284
See application file for complete search history.

(56) References Cited

U.S. PATENT DOCUMENTS

| | | | |
|---|---|---|---|
| 10,147,442 B1 * | 12/2018 | Panchapagesan | G06N 3/04 |
| 2019/0156215 A1 * | 5/2019 | Matveev | G06N 20/10 |
| 2020/0125958 A1 * | 4/2020 | Ishiguro | G06N 5/04 |
| 2021/0035563 A1 * | 2/2021 | Cartwright | G06N 3/084 |
| 2021/0182394 A1 * | 6/2021 | Condessa | G06N 3/044 |
| 2022/0366248 A1 * | 11/2022 | Piao | G06V 10/82 |

OTHER PUBLICATIONS

Jacob Devlin et al., "Bert: Pre-training of Deep Bidirectional Transformers for Language Understanding," Proc. of 2019 Conf. of N. Am. Chapt. of the Assoc. for Computational Linguistics: Human Language Technologies, vol. 1, arXiv:1810.04805v2, 15 pages (2019).

* cited by examiner

*Primary Examiner* — Eric Yen
(74) *Attorney, Agent, or Firm* — Finnegan, Henderson, Farabow, Garrett & Dunner, LLP

(57) ABSTRACT

An information learning apparatus includes a processing circuitry. The processing circuitry is configured to: acquire text information and field information included in the text information; calculate a field loss based on the text information and the field information; and store parameters of a trained model, and updating the parameters of the model based on the field loss.

10 Claims, 5 Drawing Sheets

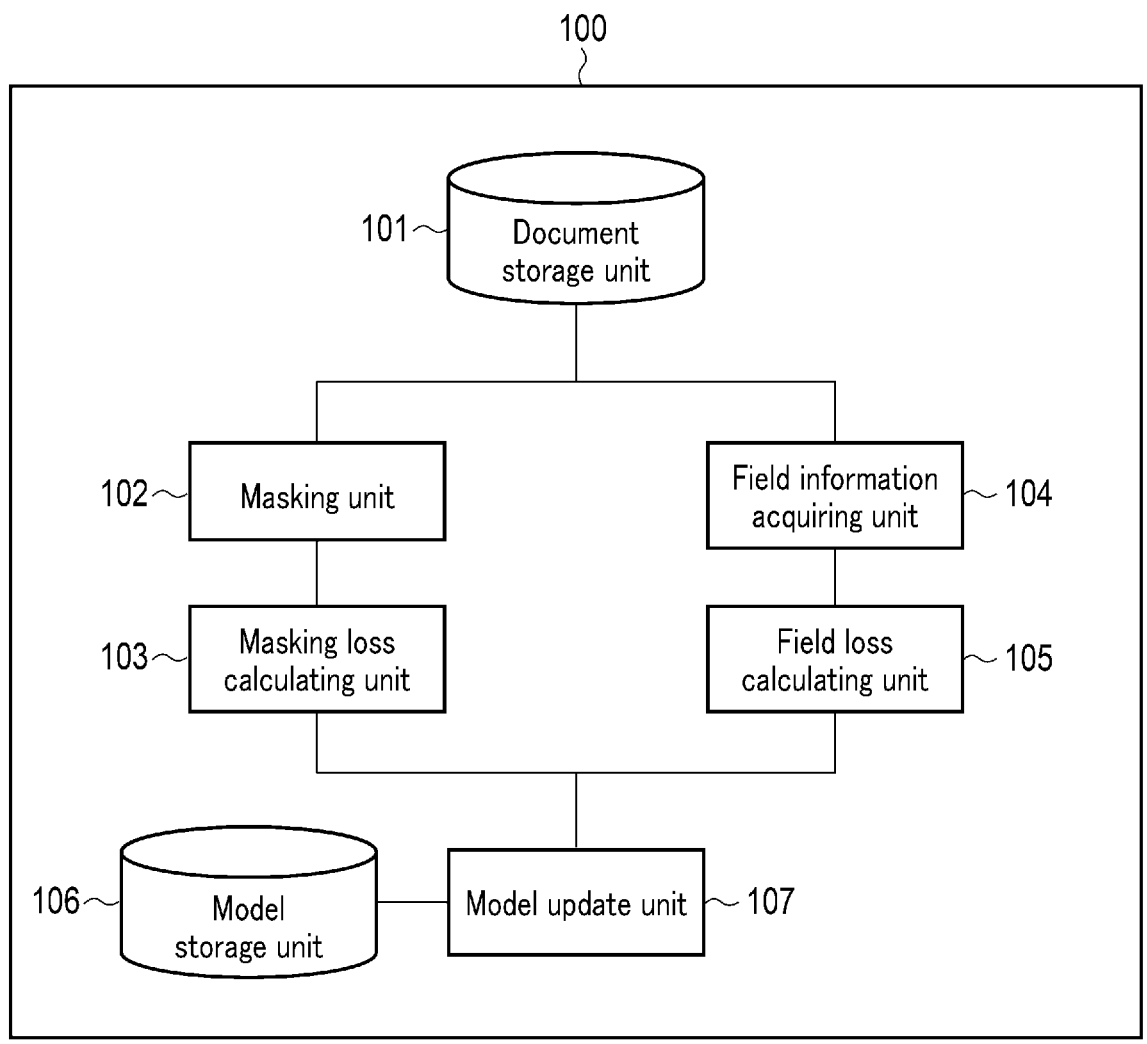
F I G. 1

Document 1
[Date]
Month, day, year
[Subject]
Anomaly occurred in OO···
[Event]
OO device is leaking
[Disposal]
Execute exchange of ΔΔ
[Result]
Wait and see. Wait for results of inspection of □□

Document 2
[Date]
Month, day, year
[Subject]
Alarm was issued
[Event]
Light of OO device is turned on
[Disposal]
Execute replacement of ΔΔ
[Result]
□□ is under inspection Document 3
[Date]
Month, day, year
[Subject]
ΔΔ leakage inspection

FIG. 2

| Text information | Part | A | Not | ##good |
|---|---|---|---|---|
| Masked text information | Part | A | [MASK] | [MASK] |

FIG. 3

| Text information | Field information |
|---|---|
| Local/remote connection is impossible | Phenomenon |
| Part A not good | Cause |
| Data were taken to conduct inspection | Disposal |
| Wait and see | Results of disposal |

FIG. 4

| Text information 1 | Text information 2 | Field information |
|---|---|---|
| Disposed by exchange of Part B | Finished by exchange of Part B | Positive |
| Power anomaly of Part C | Temperature anomaly | Negative |
F I G. 6
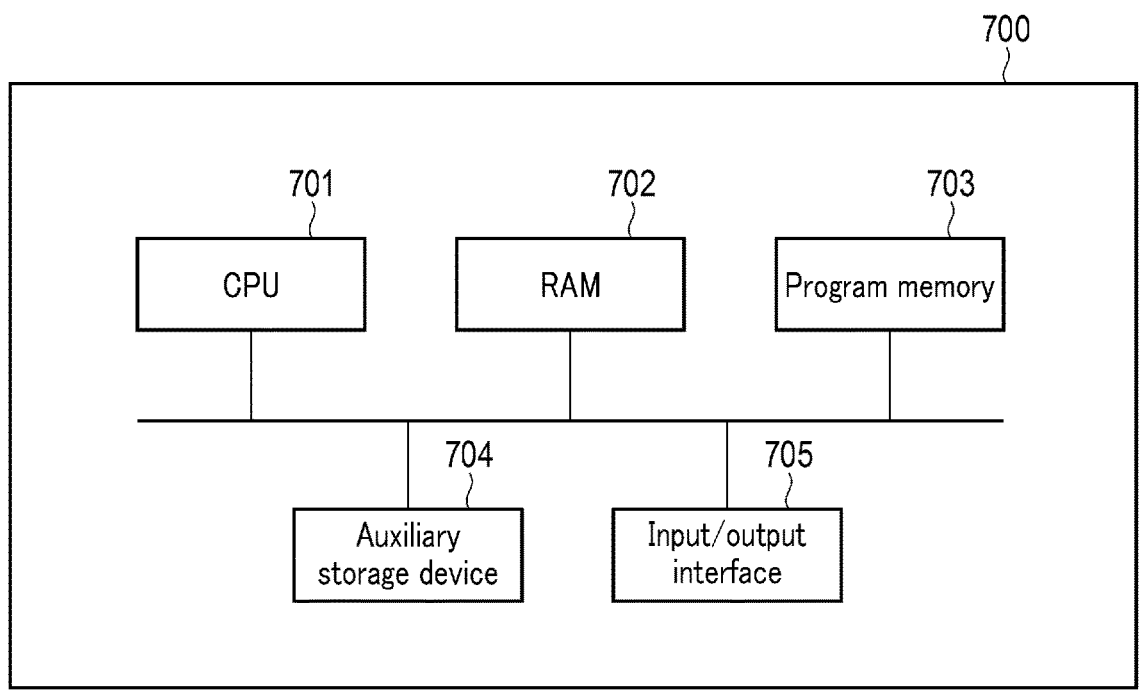
F I G. 7

INFORMATION LEARNING APPARATUS, METHOD, AND STORAGE MEDIUM

CROSS-REFERENCE TO RELATED APPLICATION

This application is based upon and claims the benefit of priority from prior Japanese Patent Application No. 2023-003202, filed Jan. 12, 2023, the entire contents of which are incorporated herein by reference.

FIELD

Embodiments described herein relate generally to an information learning apparatus, a method, and a storage medium.

BACKGROUND

In a natural language processing field, distributional hypothesis exists. Distributional hypothesis indicates that meanings of words are expressed by contexts. Context is expressed by arrangement of adjacent sentences and previous and following words. For this reason, in the natural language processing field, a general method is learning word embedded expressions using contexts f a large-scale corpus (text data set).

In recent years, development of general-purpose large-scale language models has actively been executed. A technique of executing pre-training using a large-scale corpus has been presented as a conventional information learning method of a general-purpose large-scale language model. In such a technique, it is characteristic of acquiring understanding of language through training tasks of pre-training. One of effects acquired by using a pretrained model is that context-dependent word embedded expressions can be acquired. Such language models trained in advance are frequently used to solve downstream tasks of language processing, such as Sequential Labeling and Question Answering.

As documents used for training of such a large-scale language model, there are trouble reports acquired by accumulating information relating to past troubles in manufacturing of apparatuses and/or operations of devices. Because trouble reports are often formed of short-sentence text information divided into fields, such as events and causes of troubles that occurred, context information thereof that can be used for learning of word embedded expressions is limited. The term "short-sentence document" indicates a document including a smaller number of sentences in the document or a document including a small number of words included in a sentence. In pre-training of a general-purpose language model using a corpus of such trouble reports including many short sentences, difficulty exists in learning similarity of paraphrase expressions (words) indicating the situation of the same trouble.

BRIEF DESCRIPTION OF THE DRAWINGS

FIG. 1 is a diagram illustrating an example of a configuration of an information learning apparatus according to a first embodiment.

FIG. 2 is a diagram illustrating an example of a document set.

FIG. 3 is a diagram illustrating an example of results of mask processing.

FIG. 4 is a diagram illustrating an example of text information and field information according to a first embodiment.

FIG. 6 is a diagram illustrating an example of text information and field information according to a second embodiment.

FIG. 7 is a diagram illustrating an example of a configuration of an information learning apparatus according to an application example.

DETAILED DESCRIPTION

Figure 5:
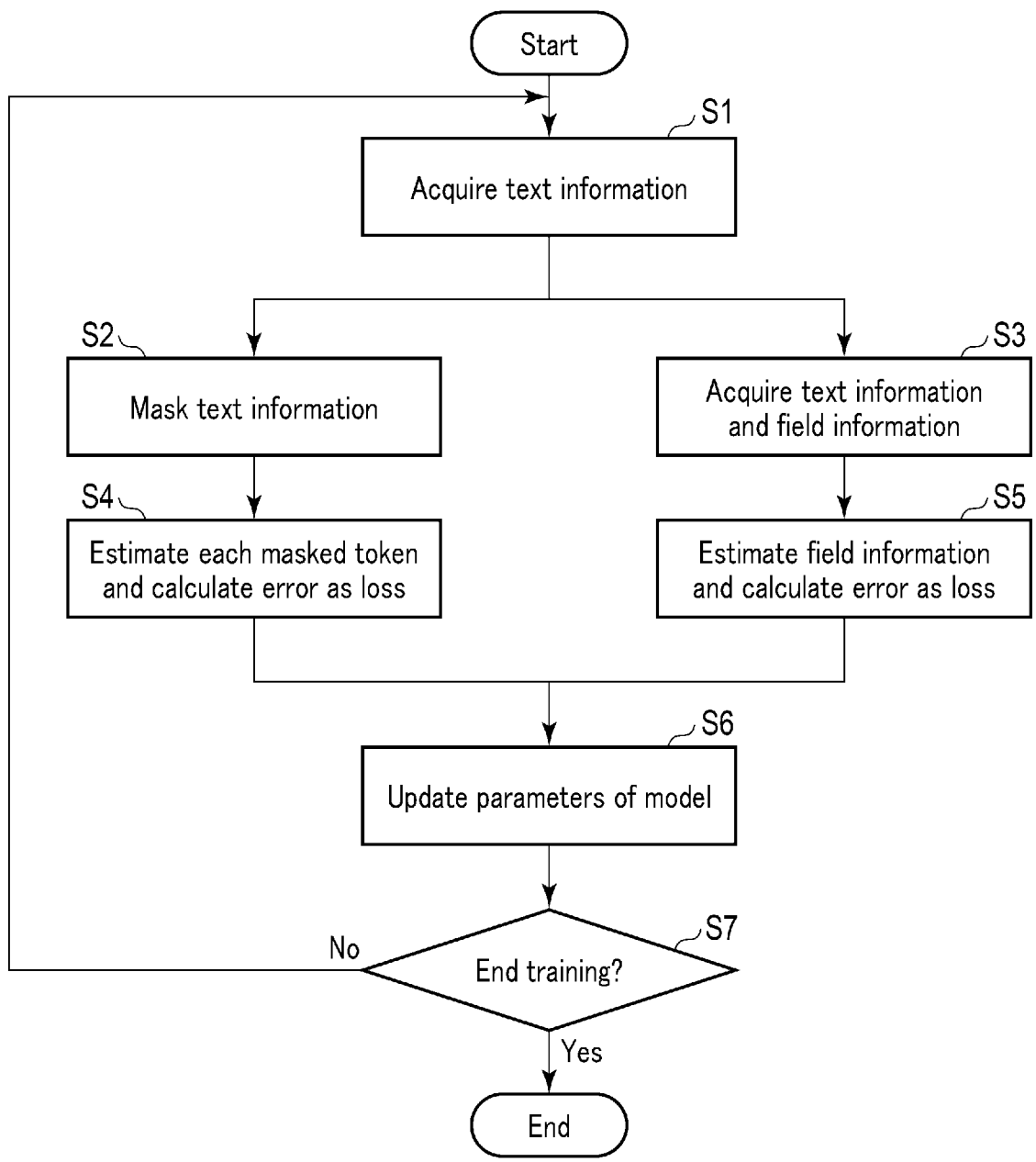
FIG. 5 is a flowchart illustrating a processing procedure of learning processing executed by the information learning apparatus according to the first embodiment.

In general, according to one embodiment, an information learning apparatus includes a processing circuitry. The processing circuitry is configured to: acquire text information and field information included in the text information; calculate a field loss based on the text information and the field information; and store parameters of a trained model, and updating the parameters of the model based on the field loss.

Embodiments of an information learning apparatus, a method, and a storage medium will be explained hereinafter with reference to drawings. In the following explanation, constituent elements having substantially the same functions and structures are denoted by the same reference numerals, and an overlapping explanation thereof will be made only when necessary.

First Embodiment

FIG. 1 is a diagram illustrating a configuration of an information learning apparatus 100 according to a first embodiment. The information learning apparatus 100 is an apparatus generating a general-purpose large-scale language model by pre-training using a large-scale corpus. The information learning apparatus 100 is connected to a server and/or a system managing document data via a network or the like. The network is, for example, a LAN (Local Area Network). Connection to the network may be wired connection or wireless connection. The network is not limited to a LAN, but may be the Internet or a public communication line or the like.

The information learning apparatus 100 includes a document storage unit 101, a masking unit 102, a masking loss calculating unit 103, a field information acquiring unit 104, a field loss calculating unit 105, a model storage unit 106, and a model update unit 107. The information learning apparatus 100 also includes processing circuitry controlling the whole information learning apparatus 100 and a storage medium (memory), as a hardware configuration.

The processing circuitry is a processor executing functions of the masking unit 102, the masking loss calculating unit 103, the field information acquiring unit 104, the field loss calculating unit 105, and the model update unit 107, by loading and executing a program in the storage medium. The processing circuitry is formed of an integrated circuit including a CPU (Central Processing Unit), an ASIC (Application Specific Integrated Circuit) and/or a FPGA (Field Programmable Gate Array) and the like. The processor may be formed of an integrated circuit or a plurality of integrated circuits.

The storage medium stores a processing program used by the processor and parameters and tables and the like used for arithmetic operations in the processor. The storage medium is a storage device, such as an HDD (Hard Disk Drive), a SSD (Solid State Drive), and an integrated circuit, storing various types of information. The storage medium may be a portable storage medium, such as a CD (Compact Disk), a DVD (Digital Versatile Disk), and a flash memory, as well as a HDD and/or SSD, or a drive device reading and writing various types of information from and to a semiconductor memory element, such as a flash memory and a RAM (Random Access Memory). The storage medium includes the document storage unit 101 and the model storage unit 106. The document storage unit 101 and the model storage unit 106 may be formed of a storage device or a plurality of storage devices.

The functions of the masking unit 102, the masking loss calculating unit 103, the field information acquiring unit 104, the field loss calculating unit 105, and the model update unit 107 may be implemented by a single processing circuitry. As another example, a plurality of independent processors may be combined to form processing circuitry, and the functions of the units may be implemented by execution of programs by the processors. The functions of the document storage unit 101, the masking unit 102, the masking loss calculating unit 103, the field information acquiring unit 104, the field loss calculating unit 105, and the model update unit 107 may be installed as individual hardware circuits.

The document storage unit 101 stores text information and field information. Specifically, the document storage unit 101 stores text data of a plurality of documents. Text data of documents is an example of text information. In the following explanation, the element "text data of documents" is simply referred to as "documents".

As the documents, for example, various infrastructure-domain documents can be used. Examples of the infrastructure-domain documents include quality activity records of products, maintenance records, trouble reports and/or daily reports recording troubles that occurred in factories. The factories are working sites in which operation and maintenance of power/chemical plants are performed. Infrastructure-domain documents often include a small number of sentences in a document and a small number of words included in a sentence. In addition, it is difficult to prepare a large number of infrastructure-domain documents for learning. For this reason, difficulty exists in executing learning of features of documents with accuracy. On the other hand, infrastructure-domain documents are often formed of a plurality of predetermined items. In each of the items, detailed information relating to a specific theme is described as a text. Accordingly, text information included in documents is formed of a plurality of predetermined item names and detailed information belonging to the respective items. Text information of the item name and text information of detailed information described in the item are referred to as "field". The text information of the detailed information includes field information relating to the field. The field information is, for example, the item name to which the text information belongs.

FIG. 2 is a diagram illustrating an example of a document set including typical trouble reports. The document set is a set of document data including a plurality of documents fulfilling a specific condition. For example, a document set of trouble reports is generated for each company, each department, and/or each power plant. The document set of FIG. 2 includes Documents 1 to 3. Each of Documents 1 to 3 is a trouble report. Each of Documents 1 and 2 includes items "date", "subject", "event", "disposal", and "result" and detailed information of each item. Document 3 includes items "date" and "subject" and detailed information of each item. In Document 1, the detailed information "anomaly occurred in OO . . . " is described in the item "subject". In this case, the detailed information "anomaly occurred in OO . . . " has the item "subject" as the field information.

The masking unit 102 masks a token in the text information. Specifically, the masking unit 102 supplies the text information to a morphological analyzer to divide the text information into tokens each formed of one or more characters, and masks each of the generated tokens at random. The morphological analyzer divides the Japanese text into morphemes. For example, public tools, such as Mecab and Juman, can be used as the morphological analyzer.

FIG. 3 is a diagram illustrating an example of results of masking for the text "part A not good" included in the text information. The text "part A not good" is divided into morphemes "part/A/not/##good" by masking, and the morphemes "not" and "##good" in the morphemes are paraphrased into special expression "[MASK]".

The masking loss calculating unit 103 calculates a masking loss to estimate the masked tokens. In this operation, the masking loss calculating unit 103 calculates a loss using estimation results of the masked tokens. Specifically, the masking loss calculating unit 103 converts each of the tokens generated by the processing by the masking unit 102 into an embedded expression vector using a model, such as a neural network, acquires a vector expression of the context information using Transformer or LSTM (Long Short Term Memory) or the like, and estimates the output token using the vector expression of the context information and a fully-connected layer. Thereafter, the masking loss calculating unit 103 calculates an error between the input and the output of the fully-connected layer as a loss. As a loss calculating function, for example, a cross entropy for multi-class classification can be used. Loss calculation results are used for processing of updating parameters of a model trained in the model update unit 107. The loss calculated by the masking loss calculating unit 103 corresponds to a masking loss.

The field information acquiring unit 104 acquires text information and field information included in the text information. In this operation, the field information acquiring unit 104 acquires a sentence and field information of the sentence as a pair, for each of sentences included in the text information. For example, the field information acquiring unit 104 acquires a field item to which the sentence belongs, as the field information, for each of sentences included in the text information. For example, item names included in a specific document set are used as the field items. For example, in a case where the document set illustrated in FIG. 2 is used as text information, the items "date", "subject", "event", "disposal", and "result" can be used as the field items. FIG. 4 is a diagram illustrating an example of the text information and the field information. FIG. 4 illustrates that, for example, the text information "local/remote connection is impossible" belongs to the field item "phenomenon". Each of the sentences included in the text information may be divided into morphemes, and field information may be applied to each of the acquired elements. The field items may be referred to as "field types".

It is not required to use all the items included in a specific document set as the field items. For example, desired items in the items "date", "subject", "event", "disposal", and "result" included in the document set illustrated in FIG. 2 may be selected as the field items, and the non-selected items may be set together as one field item, such as "others".

As another example, each of field items included in documents forming a document set may be used as field information, and all the field items included in documents forming another document set may be used as the field item "others". For example, each of sentences included in the document set A formed of documents of a certain company may be used as ones belonging to field items "event", "cause", and "result" and the like, and each of sentences included in the document set B formed of documents of other companies may be used as ones belonging to the field item "others".

As another example, a plurality of document sets may be mapped to be used. For example, in a case where documents forming the document sets A and B include the field items "event", "cause", and "result" and documents forming the document set C include the field items "event" and "cause", mapping is executed as prior definition. In this manner, the text information is mapped into text information belonging to the item "event" in the document sets A, B, and C, text information belonging to the item "cause" in the document sets A, B, and C, and text information belonging to the item "result" in the document sets A and B, and used as field information.

The field loss calculating unit 105 calculates a loss based on the text information and the field information. In this operation, the field loss calculating unit 105 calculates, as a field loss, a classification error relating to estimation results of the field item to which the text information belongs. Specifically, the field loss calculating unit 105 converts the token of the masked text information into an embedded expression vector using a model, such as a neural network, acquires a vector expression of context information using Transformer and/or LSTM (Long Short Term Memory) or the like, and estimates the field item to which the text information belongs using the vector expression of the context information and a fully-connected layer. Thereafter, the field loss calculating unit 105 calculates a classification error between the field item serving as the output of the fully-connected layer and the input field item serving as the right answer as a loss. As a loss function to calculate a loss, for example, it is possible to use a cross entropy for binary classification and/or a cross entropy for multi-class classification. Loss calculation results are used for processing of updating parameters of a model in the model update unit 107. The loss calculated by the field loss calculating unit 105 is also referred to as "field loss".

FIG. 4 is a diagram illustrating an example of text information and field items (field information) of the text information. Examples of classification tasks include binary classification as to whether the text information "local/remote connection is impossible" belongs to the field "phenomenon" and/or multi-class classification as to which of the field items "phenomenon", "cause", "disposal", and "result of disposal" the text information "local/remote connection is impossible" belongs to. The classification task may be a task of estimating the field item for each of one or more pieces of text information, or a task of estimating the field item for each of two or more pieces of text information and classifying whether the two estimated field items are the same.

When such a classification task is executed, first, a classification plane is constructed. The classification plane enables classification of vector expressions of text information using a high-dimensional feature vector space. Thereafter, by executing learning to reduce the loss calculated using the field item classification results, the vector expressions of text information are linearly separated for each of the field items. In this manner, on the feature vector space, a distance between pieces of text information belonging to the same field item decreases, and a distance between pieces of text information belonging to different field items increases. For example, with respect to Sentence 1 "exchange OO" and Sentence 2 "replace OO", in a case where classification learning is executed on the premise that the sentences belong to the same field item (for example, "disposal"), the vector expressions of the two sentences become closer to each other on the feature vector space. On the other hand, in a case where classification learning is executed on the premise that Sentence 1 and Sentence 2 belong to the different field items (for example, "phenomenon" and "disposal"), the vector expressions of the two sentences become more distant from each other on the feature vector space.

The model storage unit 106 stores parameters of the training model. The model is, for example, a pretrained machine learning model. As the model, for example, it is possible to use a Transformer-type deep learning model including an attention mechanism. For example, it is possible to use a BERT (Base) model formed of an Embedding layer, Transformer, an Encoder layer, and a LayerNorm layer, as the model. The BERT (Base) model generally includes approximately 1.1 hundred million (110 M) parameters in total.

The model update unit 107 updates parameters of the model based on the field loss. Specifically, the model update unit 107 updates parameters of the model using the loss calculated by the masking loss calculating unit 103 and the loss calculated by the field loss calculating unit 105. In this operation, the model update unit 107 updates parameters of the model by executing weighting addition of the masking loss and the field loss. Specifically, the model update unit 107 successively updates values of the parameters from the final layer to the first layer of the hidden layers of the model by error back propagation using an output error acquired by weighting addition of the masking loss and the field loss.

(Learning Processing)

The following is an explanation of operations of learning processing executed by the information learning apparatus 100. FIG. 5 is a flowchart illustrating an example of a procedure of the learning processing. The learning processing is processing of updating parameters of the model using text information and field information included in the text information. The processing procedure in each processing explained hereinafter is a mere example, and each processing can be properly changed as long as possible. In the processing procedure explained hereinafter, proper omission, replacement, and addition of steps are possible according to the mode of embodiment.

(Step S1)

In the learning processing, first, the information learning apparatus 100 acquires text information. In this operation, the information learning apparatus 100 reads documents, such as trouble reports, stored in the document storage unit 101 as the text information, and acquires text data formed of one or more characters, such as "Part A not good", included in the trouble reports.

(Step S2)

When text information is acquired at Step S1, the masking unit 102 masks the acquired text information. In this operation, the masking unit 102 divides the text data acquired at Step S1 into tokens by morphological analysis, and masks the tokens at random. For example, as illustrated in FIG. 3, the masking unit 102 paraphrases the tokens "not" and "##good" into special expression "[MASK]" to acquire the masked text.

(Step S3)

In addition, when text information is acquired at Step S1, the field information acquiring unit 104 acquires text information and field information included in the text information. In this operation, the field information acquiring unit 104 acquires field information included in the document from the document storage unit 101. For example, the field information acquiring unit 104 acquires text information formed of one or more sentences and a field item to which the text information belongs as a pair, as illustrated in FIG. 4.

For example, in the example of FIG. 4, the text information "local/remote connection is impossible" and the field information indicating the field item "phenomenon" are acquired as a pair, and the text information "Part A not good" and the field information indicating the field item "cause" are acquired as a pair.

(Step S4)

When masking is executed at Step S2, the masking loss calculating unit 103 estimates each of the masked tokens, and calculates a loss using the estimation result. In this operation, the masking loss calculating unit 103 converts each of the masked tokens acquired at Step S2 into an embedded expression vector using a machine learning model, such as a neural network, acquires a vector expression of the context information using Transformer or LSTM or the like, and estimates the output token using the fully-connected layer. Thereafter, the masking loss calculating unit 103 calculates an error between the input and the output of the full-connected layer as a loss using a cross entropy for multi-class classification.

(Step S5)

When field information is acquired at Step S3, the field loss calculating unit 105 applies the field information to the acquired text information, and calculates a loss. In this operation, the field loss calculating unit 105 masks the text information, converts the acquired masked token into an embedded expression vector using a machine learning model, such as a neural network, acquires a vector expression of context information using Transformer and/or LSTM or the like, and estimates the field item to which the text information belongs and relation using the fully-connected layer. Thereafter, the field loss calculating unit 105 calculates a classification error between the output of the fully-connected layer and the input field item serving as the right answer as a loss using a cross entropy for binary classification and/or a cross entropy for multi-class classification.

(Step S6)

When the losses are calculated at Step S4 and Step S5, the model update unit 107 updates parameters of the model using the calculation results. In this operation, the model update unit 107 executes weighting addition of the loss calculated at Step S4 and the loss calculated at Step S5, and successively updates values of the parameters from the final layer to the first layer of the hidden layers of the model stored in the model storage unit 106 by using error back propagation for the added loss.

(Step S7)

If a training end condition is satisfied (Step S7: Yes), the information learning apparatus 100 ends the model learning processing. As the training end condition, for example, it is possible to use an upper limit value of the training time and/or the number of trainings. If the training end condition is not satisfied, the processing returns to Step S1, and the processing from Step S1 to Step S6 is executed repeatedly until the training end condition is satisfied.

The following is an explanation of effects of the information learning apparatus 100 according to the present embodiment.

Documents that are often described in short sentences, such as infrastructure-domain trouble reports, have a small number of sentences in a document and a small number of words included in a sentence, and context information included in the documents is limited. For this reason, there is the problem that difficulty exists in learning similarity of paraphrase expressions indicating the situation of the same trouble by a conventional method of training a general-purpose large-scale language model used for natural language processing. For example, in different documents, different expressions such as "exchange" and "replace" are used in some cases even if they indicate the situation of the same trouble. These paraphrase expressions often appear in the same item of trouble reports. In such a case, in a conventional learning method, the paraphrase expressions such as "exchange" and "replace" are distant from each other in the embedded expression because they appear in different contexts, and cannot be used as the expressions of the same meaning.

To solve such a problem, the information learning apparatus 100 according to the present embodiment includes the field information acquiring unit 104, the field loss calculating unit 105, the model storage unit 106, and the model update unit 107. The field information acquiring unit 104 acquires text information and field information included in the text information. The field loss calculating unit 105 calculates a field loss based on the text information and the field information. The model storage unit 106 stores parameters of the model. The model update unit 107 updates parameters of the model based on the field loss.

As the field information, for example, it is possible to use the field items to which the text information belong. As the field items, it is possible to use item names of trouble reports, such as the items "date", "subject", "event", "disposal", and "result". In this case, the field loss calculating unit 105 calculates a classification error relating to estimation results of the field item to which the text information belongs, as the field loss.

With the structure described above, the information learning apparatus 100 according to the present embodiment enables a large-scale language model used for natural language processing to learn similarity of paraphrase expressions (words) indicating the same meaning, by updating parameters of the model in consideration of the field information relating to the semantic field included in the trouble reports. This structure enables learning of similarity of paraphrase expressions (words) appearing in the same field item and indicating the same meaning.

In addition, the field items are used as field information, a loss is calculated by applying the field information to the text information, and the model is updated using error back propagation for the calculated loss. This structure reduces a distance on the embedding space between the vector expressions of Sentence 1 "exchange OO" and Sentence 2 "replace OO" serving as sentences written in the same field "disposal". In addition, this structure enables learning to reduce a distance between paraphrase expressions indicating the same situation, such as "exchange" and "replace", as words frequently appearing in the same field. This structure enables acquisition of a natural language processing model with high accuracy for infrastructure domains.

In addition, the information learning apparatus 100 according to the present embodiment further includes the document storage unit 101 storing the text information and the field information, the masking unit 102 masking the token in the text information, and the masking loss calculating unit 103 calculating a masking loss using estimation results of the masked token. The model update unit 107 updates the parameters of the model using the masking loss and the field loss. More specifically, the model update unit 107 executes weighting addition of the masking loss and the field loss and updates the parameters of the model. This structure further improves the accuracy of the model by updating the model using the masking loss in addition to the field loss described above. The masking unit 102 and the masking loss calculating unit 103 may be omitted.

As another example, a combination of a plurality of field items having strong semantic latent relation may be used as the field information. For example, in a case where the meaning of words included in the items "title" and "phenomenon" should be brought closer, one piece of field information "title and phenomenon" may be provided to a pair of a sentence belonging to the item "title" and a sentence belonging to the item "phenomenon". By executing calculation of the loss and update of the model using such a piece of field information, it is possible to bring a distance on the embedding space between the semantic expression belonging to the item "title" and the semantic expression belonging to the item "phenomenon" closer.

The embodiment is not limited to application to infrastructure-domain documents, but is also applicable to semi-structured documents including text data stored for each logical element, such as a category.

Second Embodiment

A second embodiment will be explained hereinafter. The present embodiment is acquired by modifying the structure of the first embodiment as follows. An explanation of a configuration, operations, and effects similar to those of the first embodiment will be omitted. In the present embodiment, attention is paid to latent expressions of the field, and training of a model is executed using two sentences having close meanings as positive examples.

In the same manner as the first embodiment, a field information acquiring unit 104 acquires text information and field information included in the text information. The field information acquiring unit 104 according to the present embodiment acquires semantic relation between field items to which the pieces of text information belong, in addition to the field items, as the field information. For example, the field information acquiring unit 104 acquires a pair of positive texts and/or a pair of negative texts having latent semantic expressions over the field, as the field information. For example, the field information acquiring unit 104 determines whether two pieces of text information have positive relation or negative relation as the semantic relation of the pair of the two pieces of text information, on the basis of the latent meaning of the field item. The field items having positive relation and the field items having negative relation are set and stored in advance. The determination result is acquired as field information of the pair of the two pieces of text information. The two sentences having the field information "positive" are learned to have close meanings in the processing in the field loss calculating unit 105 and the model update unit 107. The two sentences having the field information "negative" are learned to have distant meanings in the processing in the field loss calculating unit 105 and the model update unit 107.

Herein, the field information will be specifically explained using the document set illustrated in FIG. 2 as an example. Document 1 in FIG. 2 includes the item "event" including the text "OO device is leaking" and the item "disposal" including the text "execute exchange of AA". For this reason, pieces of the field information "belonging to different field items" and "written in the same Document 1" are acquired for the pair of the text "OO device is leaking" and the text "execute exchange of ΔΔ". In addition, Document 2 in FIG. 2 includes the item "disposal" including the text "execute replacement of ΔΔ". For this reason, pieces of the field information "written in different documents" and "written in the same field item 'disposal'" are acquired for the pair of the text "execute exchange of ΔΔ" written in the item "disposal" of Document 1 and the text "execute replacement of ΔΔ" written in the item "disposal" of Document 2.

In a case where the pair of the pieces of text information are formed of two sentences included in the same field item of the same document, it is determined that the two sentences have positive relation, and the field information indicating that they have positive relation is acquired as the field information of the two sentences.

In addition, even if the pair of the pieces of text information are formed of two sentences included in different field items of the same document, if the pair are formed of two sentences belonging to a pair of field items having close semantic relation, the relation of the two sentences is determined as positive relation, and the field information indicating that they have positive relation is acquired as the field information of the two sentences. The semantic relation between the field items is preset. For example, if it is preset that the item "event" and the item "disposal" have close meanings, the sentence written in the item "event" in Document 1 of FIG. 2 and the sentence written in the item "disposal" are determined as having latent causal relation, and the field information "positive" is set for the sentences.

In addition, even if the pair of the pieces of text information are formed of two sentences included in different documents of the same document set, if the pair are formed of two sentences belonging to the same field item, the relation of the two sentences is determined as positive relation, and the field information indicating that they have positive relation is acquired as the field information of the two sentences. For example, because the sentence written in the item "disposal" in Document 1 of FIG. 2 and the sentence written in the item "disposal" in Document 2 belong to the same field item "disposal", the sentences are determined as having latent semantic similarity, and the field information "positive" is set for the sentences.

In addition, even if the pair of the pieces of text information are formed of sentences of different documents included in the same document set, if the pair are formed of two sentences included in a pair of semantically close field items, the relation of the sentences is determined as positive relation, and the field information indicating that they have positive relation is acquired as the field information of the two sentences.

In addition, even if the pair of the pieces of text information are formed of sentences of different document sets, if the pair are formed of two sentences belonging to the same field item, the relation of the two sentences is determined as positive relation, and the field information indicating that they have positive relation is acquired as the field information of the two sentences. For example, even if the sentences belong to different document sets, the sentences written in the same item "disposal" are determined as having latent semantic similarity, and the field information "positive" is set as the field information.

In addition, if the pair of the pieces of text information are formed of sentences belonging to the field items having latent correlation, the relation of the two sentences is determined as positive relation, and the field information indicating that they have positive relation is acquired as the field information of the two sentences. The field items having latent correlation are preset. For example, the item "event" and the item "disposal" are set as field items having latent correlation, because they often include paraphrase expressions having the same meaning. In this case, the sentence written in the item "event" in Document 1 of FIG. 2 and the sentence written in the item "disposal" in Document 2 are determined as having latent semantic similarity, and the field information "positive" is set as the field information thereof.

By contrast, if the pair of the pieces of text information does not fulfill any of the conditions described above, the relation of the two sentences is determined as negative relation, and the field information indicating that they have negative relation is acquired as the field information of the two sentences. For example, if the two sentences forming the pair of the text information are sentences of different documents and sentences of different field items, and the field items are not set as items having latent correlation, the field information "negative" is set as the field information of the two sentences.

The field loss calculating unit 105 calculates a loss based on the text information and the field information. In this operation, the field loss calculating unit 105 calculates a field loss such that the pair of the pieces of text information belonging to field items having positive relation are approximated. Specifically, the field loss calculating unit 105 converts the pair of the pieces of text information to a pair of embedded expression vectors using a model, such as a neural network, acquires a pair of vector expressions of content information using Transformer or LSTM (Long Short Term Memory) or the like, and calculates a loss using cosine similarity between the vector expressions. In this operation, a loss is calculated such that the expressions of the pair of the pieces of text information having the field information "positive" are close to each other and the expressions of the pair of the pieces of text information having the field information "negative" are separated from each other. In addition, a loss is calculated to maximize cosine similarity of the expressions of the pair of the pieces of text information having the field information "positive", and to minimize cosine similarity of the expressions of the pair of the pieces of text information having the field information "negative". As a loss function to calculate a loss, for example, it is possible to use Noise Contrastive Estimation Loss or InfoNCE Loss used for contrastive learning. The loss calculation results are used for processing of updating parameters of the model in the model update unit 107.

(Learning Processing)

The following is an explanation of operations of learning processing executed by the information learning apparatus 100 according to the present embodiment. The processing procedure in each processing explained hereinafter is a mere example, and each processing can be properly changed as long as possible. In the processing procedure explained hereinafter, proper omission, replacement, and addition of steps are possible according to the mode of embodiment. The processes at Steps S1, S2, S4, S6, and S7 are the same as those in the first embodiment, and an explanation thereof will be omitted.

(Step S3)

When text information is acquired at Step S1, the field information acquiring unit 104 acquires field information included in the text information. In this operation, the field information acquiring unit 104 acquires a pair of positive texts and/or a pair of negative texts having latent semantic expressions over the field, as the field information. For example, if a pair of expressions "disposed" and "finished" is preset as a positive pair, the field information "positive" is acquired for the pair of the pieces of text information "disposed by exchange of Part B" and "finished by exchange of Part B", as illustrated in FIG. 6. In addition, if a pair of expressions "power anomaly" and "temperature anomaly" is preset as a negative pair, the field information "negative" is acquired for the pair of the pieces of text information "Part C power anomaly" and "temperature anomaly".

(Step S5)

When field information is acquired at Step S3, the field loss calculating unit 105 applies the field information to the acquired text information, and calculates a loss. In this operation, the field loss calculating unit 105 converts each of pieces of text information (for example, Text Information 1 and Text Information 2) into embedded expression vectors using a machine learning model, such as a neural network, acquires vector expressions (for example, Vector v1 and Vector v2) of content information using Transformer or LSTM or the like, and calculates cosine similarity between the vector expressions. Thereafter, a loss is calculated to maximize cosine similarity of the pair of the pieces of text information having the field information "positive", and to minimize cosine similarity of the pair of the pieces of text information having the field information "negative", using Noise Contrastive Estimation Loss or InfoNCE Loss as a loss function.

The following is an explanation of effects of the information learning apparatus 100 according to the present embodiment.

The field information acquiring unit 104 of the information learning apparatus 100 according to the present embodiment uses semantic relation of the field items to which a plurality of pieces of text information belong, as the field information. For example, the field information acquiring unit 104 determines relation of a pair of two pieces of text information based on the field items, as the field information, and acquires the determined relation as the field information. As the field information of the pair of two pieces of text information, for example, it is possible to use information relating to whether the relation thereof is positive or negative. In this case, for example, the field information of two pieces of text information can be acquired using the field items, the documents, and/or the document sets to which the pieces of the text information belong.

Thereafter, the field loss calculating unit 105 calculates a field loss such that the pair of the pieces of text information belonging to field items having positive relation are approximated.

With the structure described above, the information learning apparatus 100 according to the present embodiment provides each of the tokens with a latent meaning of the field, brings embedded expressions of words frequently appearing in the same item close to each other, and brings the vector expressions of sentences written in the same item close to each other. For example, even in a case where the expressions "exchange OO" and "replace OO" serving as paraphrase expressions indicating the situation of the same trouble are included in different documents of the same item, learning is executed such that the expressions of the pair thereof are approximated, based on the field information indicating that they belong to the same item. This structure brings the embedded expressions of the paraphrase expressions "exchange" and "replace" indicating the situation of the same trouble close to each other.

Application Example

The information learning apparatus 100 can also be implemented by using, for example, a general-purpose computer apparatus as basic hardware. Specifically, the document storage unit, the masking unit, the masking loss calculating unit, the field information acquiring unit, the field information loss calculating unit, the model storage unit, and the model update unit can be implemented by causing a processing mounted on the computer apparatus to execute a program. In this operation, the information learning apparatus 100 may implement the units by installing the program described above in the computer apparatus in advance, storing the program in a storage medium, such as a CD-ROM, or distributing the program via a network to properly install the program in the computer apparatus.

FIG. 7 is a block diagram illustrating a hardware configuration of an information learning apparatus 700 according to an application example. The application example is a specific example of the embodiments and each of modifications, and has a mode in which the information learning apparatus 100 is implemented by a computer.

The information learning apparatus 700 includes a CPU (Central Processing Unit) 701, a RAM (Random Access Memory) 702, a program memory 703, an auxiliary storage device 704, and an input/output interface 705, as hardware. The CPU 701 communicates with the RAM 702, the program memory 703, the auxiliary storage device 704, and the input/output interface 705 via a bus. Specifically, the information learning apparatus 700 according to the present embodiment is implemented by a computer having such a hardware configuration.

The CPU 701 is an example of a general-purpose processor. The RAM 702 is used as a working memory by the CPU 701. The RAM 702 includes a volatile memory, such as a SDRAM (Synchronous Dynamic Random Access Memory). The program memory 703 stores a data analysis program to implement the units according to each of the embodiments. The data analysis program may be, for example, a program to cause the computer to implement the functions of the document storage unit 101, the masking unit 102, the masking loss calculating unit 103, the field information acquiring unit 104, the field loss calculating unit 105, the model storage unit 106, and the model update unit 107. Examples of the program memory 703 include a ROM (Read-Only Memory), part of the auxiliary storage device 704, or a combination thereof. The auxiliary storage device 704 stores data in a non-transitory manner. The auxiliary storage device 704 includes a nonvolatile memory, such as a HDD (Hard Disk Drive) and a SSD (Solid State Drive).

The input/output interface 705 is an interface to connect to other devices. The input/output interface 705 is used for connection to, for example, a keyboard, a mouse, a database, and a display.

The data analysis program stored in the program memory 703 includes a computer-executable command. The data analysis program (computer-executable command) causes the CPU 701 to execute predetermined processing, when it is executed by the CPU 701 serving as the processing circuitry. For example, when the data analysis program is executed by the CPU 701, the data analysis program causes the CPU 701 to execute a series of processes explained with respect to the units of FIG. 1. For example, when the computer-executable command included in the data analysis program is executed by the CPU 701, the computer-executable command causes the CPU 701 to execute a data analysis method. The data analysis method may include steps corresponding to the functions of the document storage unit 101, the masking unit 102, the masking loss calculating unit 103, the field information acquiring unit 104, the field loss calculating unit 105, the model storage unit 106, and the model update unit 107 described above. The data analysis method may properly include the steps illustrated in FIG. 5.

The data analysis program may be provided in a state of being stored in a computer-readable storage medium to the information learning apparatus 700 being a computer. In this case, for example, the information learning apparatus 700 further includes a drive (not illustrated) reading data from a storage medium, and acquires the data analysis program from the storage medium. Examples of the storage medium that can be properly used include a magnetic disk, an optical disk (such as CD-ROM, CD-R, DVD-ROM, DVD-R), a magneto-optical disk (such as MO). The storage medium may also be referred to as "non-transitory computer-readable storage medium". The data analysis program may be stored in a server on a communication network, and the information learning apparatus 700 may download the data analysis program from the server using the input/output interface 705.

The processing circuitry executing the data analysis program is not limited to a general-purpose hardware processor, such as the CPU 701, but may be a dedicated hardware processor, such as an ASIC (Application Specific Integrated Circuit). The term "processing circuitry (processing unit)" includes at least one general-purpose hardware processor, at least one dedicated hardware processor, and a combination of at least one general-purpose hardware processor and at least one dedicated hardware processor. In the example illustrated in FIG. 7, the CPU 701, the RAM 702, and the program memory 703 correspond to the processing circuitry.

Thus, any of the embodiments described above provides an information learning apparatus, a method, and a program causing a large-scale language model used for natural language processing to learn similarity of paraphrase expressions (words) indicating the same meaning.

The present invention is not limited to the embodiments described above, but can be implemented with the constituent elements modified within a range not departing from the gist of the invention. Various inventions can be made by proper combinations of the constituent elements disclosed in the embodiments. For example, some constituent elements may be deleted from the constituent elements disclosed in the embodiments. As another example, constituent elements of the different embodiments may properly be used in combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An information learning apparatus comprising a processing circuitry, the processing circuitry being configured to:
   acquire text information and field information included in the text information;
   calculate a field loss based on the text information and the field information; and
   store parameters of a trained model, and updating the parameters of the model based on the field loss.

2. The information learning apparatus according to claim 1, further comprising:
   a document storage unit storing the text information and the field information, wherein
   the processing circuitry is configured to mask a token in the text information and calculates a masking loss using estimation results of the masked token.

3. The information learning apparatus according to claim 2, wherein the processing circuitry is configured to update the parameters of the model using the masking loss and the field loss.

4. The information learning apparatus according to claim 3, wherein the processing circuitry is configured to execute weighting addition of the masking loss and the field loss and updates the parameters of the model.

5. The information learning apparatus according to claim 1, wherein the field information includes a field item to which the text information belongs.

6. The information learning apparatus according to claim 5, wherein the processing circuitry is configured to calculate, as the field loss, a classification error relating to estimation results of the field item to which the text information belongs.

7. The information learning apparatus according to claim 1, wherein the field information includes semantic relation of field items to which a plurality of pieces of the text information belong.

8. The information learning apparatus according to claim 7, wherein the processing circuitry is configured to calculate a field loss such that a pair of pieces of text information belonging to field items having positive relation are approximated.

9. A method comprising:
   acquiring text information and field information included in the text information;
   calculating a field loss based on the text information and the field information; and
   updating parameters of a trained model based on the field loss.

10. A non-transitory computer-readable storage medium storing a program for causing a computer to execute:
    a function of acquiring text information and field information included in the text information;
    a function of calculating a field loss based on the text information and the field information; and
    a function of updating parameters of a trained model based on the field loss.

* * * * *